US010796358B1

(12) United States Patent
Ducrou et al.

(10) Patent No.: US 10,796,358 B1
(45) Date of Patent: Oct. 6, 2020

(54) IDENTIFYING COMPANION GESTURES AND BEHAVIOR

(71) Applicant: Amazon Technologies, Inc., Reno, NV (US)

(72) Inventors: Jon Robert Ducrou, Seattle, WA (US); Christopher Andrew Stephens, Issaquah, WA (US); Ismael Medrano, Seattle, WA (US); Ammar Chinoy, Seattle, WA (US); Michel Leonard Goldstein, Seattle, WA (US); Elie Micah Kornfield, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 851 days.

(21) Appl. No.: 14/035,827

(22) Filed: Sep. 24, 2013

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0631* (2013.01)

(58) Field of Classification Search
CPC .......................................... G06Q 30/06–30/08
USPC ................................................. 705/26.1–27.2
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 2003/0002712 | A1 | 1/2003 | Steenburgh et al. |
| 2003/0018522 | A1* | 1/2003 | Denimarck ...... G06Q 20/40145 705/14.23 |
| 2004/0181467 | A1 | 9/2004 | Raiyani et al. |
| 2008/0040157 | A1* | 2/2008 | Saunders ............... G06Q 10/10 705/3 |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0121017 | A1 | 5/2009 | Cato et al. |
| 2009/0245573 | A1 | 10/2009 | Saptharishi et al. |
| 2011/0011936 | A1 | 1/2011 | Morandi et al. |

(Continued)

OTHER PUBLICATIONS

Twining, C.J., Taylor, C.J., & Courtney, P., Behavior Research Methods Instruments and Computers 33.3 (Aug. 2001) 381-391. (Year: 2001).*

(Continued)

*Primary Examiner* — Ethan D Civan
(74) *Attorney, Agent, or Firm* — Athorus, PLLC

(57) ABSTRACT

This disclosure describes a system for identifying users and/or their companions, utilizing the behavior and gestures of a user's companion to assist the user, and developing user paths based on user and/or companion preferences. A companion profile may be established to identify the companion and associated the companion with the user. Likewise, a user pattern that includes both the user and the companion may be established and used to track the location of the user and/or companion while in the materials handling facility.

24 Claims, 9 Drawing Sheets

(56) References Cited

U.S. PATENT DOCUMENTS

| | | |
|---|---|---|
| 2012/0284132 A1 | 11/2012 | Kim et al. |
| 2013/0069978 A1* | 3/2013 | Tanaka ................ G06K 9/62 345/619 |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2015/0019391 A1 | 1/2015 | Kumar et al. |
| 2015/0073907 A1 | 3/2015 | Purves et al. |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
Cristian Pop, "Introduction to the BodyCom Technology", Microchip AN1391, May 2, 2011, pp. 1-26, vol. AN1391, No. DS01391A, Publisher: 2011 Microchip Technology Inc.

\* cited by examiner

IDENTIFYING COMPANION GESTURES AND BEHAVIOR

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
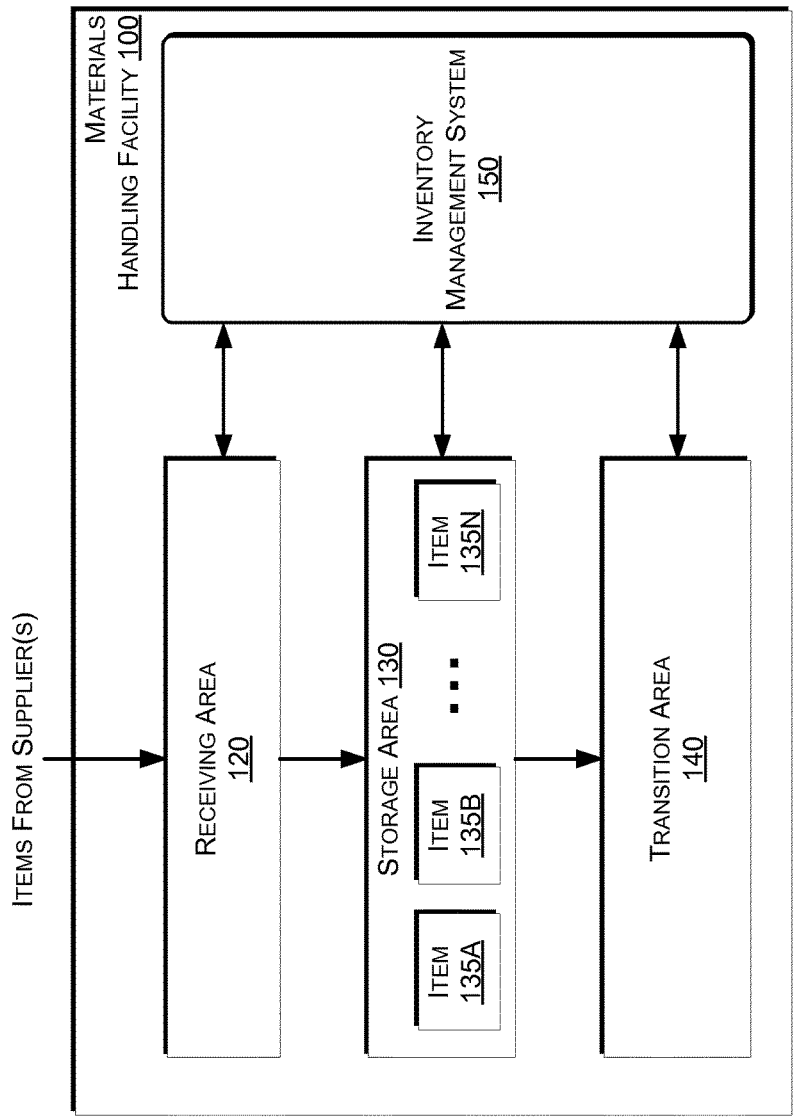
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for identifying users and/or their companions, utilizing the behavior and gestures of a user's companion to assist the user, and developing user paths based on user and/or companion preferences. A "companion," as used herein, may be a child, friend, pet (e.g., dog, cat, bird, pig), colleague, spouse, partner, parent, caretaker, etc. that is accompanying the user in a materials handling facility. A "pet," as used herein, is any non-human animal, often domesticated or trained for the purpose of providing companionship to, service to, or work for a human.

When a user enters and/or arrives at a materials handling facility a variety of techniques may be used to identify the user. For example, an active and/or visual identifier of the user may be detected and used to identify the user, images of the user may be captured and processed to identify the user, the user may provide an identification (e.g., user name and password, badge, card), etc. In some instances, the user may be accompanied by one or more companions. In the implementations described herein, a companion profile may be established or selected for each of the user's companions, associated with the user's profile and utilized to assist in identifying the user and provide assistance to the user (e.g., development of a user path). Similar to identifying a user, a companion profile may be selected through detection of an active and/or visual identifier associated with the companion and/or images of the companion may be obtained and processed to identify the companion. A companion profile includes information about the companion. For example, the companion profile may identify the type of companion (e.g., dog, cat, bird, pig, child, spouse, colleague), the shape of the companion, the size of the companion, the color of the companion, the identity of the companion, and the like.

In some implementations, a user pattern that represents both the user and the user's companion(s) may be established for the user while in the materials handling facility and used to assist in tracking, monitoring and/or later identifying the user while in the materials handling facility. For example, when multiple users are close together within a materials handling facility, it is often difficult to distinguish between users. If one of the users is with a companion, the user pattern associated with that user will include information about the companion and be different than the other user patterns, thereby assisting in the disambiguation between the multiple users. Likewise, even if more than one user is accompanied by a companion, if the companions are of different types, shapes, sizes and/or colors, the differences of the companions may still be used to disambiguate between the users as the user patterns will be different. For example, if user A has a large brown dog (companion) with them and user B has a small white dog (companion) with them, the size, color and shape of those companions will result in distinguishable user patterns that make disambiguation between the two users more likely.

In some implementations the behavior and/or gestures of companions may be monitored and used to assist users. Companions often present different gestures that can be visually identified. For example, a dog may wag its tail and/or pull on its leash (each a gesture) to express happiness and/or interest in an object. These types of gestures may be used to identify areas within the materials handling facility that include items of interest to the companion and/or to identify other users or other companions of interest to the companion. Likewise, other gestures (tail between legs, showing of teeth, raised hair, ears back) may be identified as expressions of fear, anger and/or aggression by the companion (generally referred to herein as warning gestures). These types of gestures may be used to assist in routing the user/companion away from other users/companions, away from different parts of the materials handling facility and/or to take other actions. For example, if the companion is presenting a warning gesture, such as showing of teeth, an action may be performed to avoid a conflict between the companion and the object of aggression (e.g., a companion of another user). In some implementations, the action may be to distract the companion through audible and/or visual interruptions, to notify the user of the companion's aggression, to notify another user of the companion's aggression, etc.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees may pick items 135 using written or electronic pick lists derived from customer orders.

Figure 2:
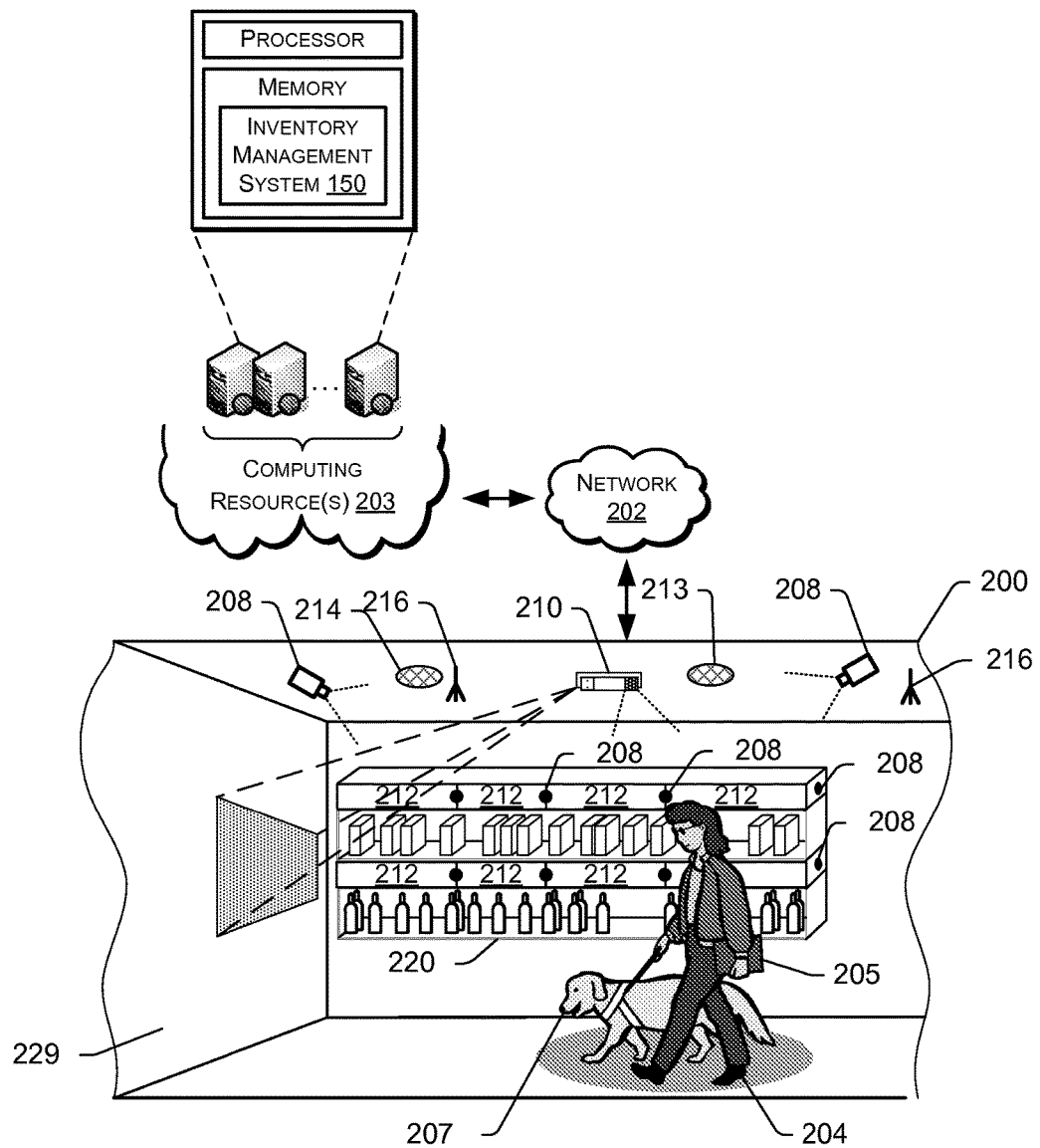
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations, users and/or companions within the materials handling facility can be captured. In some implementations, the image capture devices 208 may be positioned overhead, such as on the ceiling to capture images of users, companions and/or locations within the materials handling facility. In addition, in some implementations, one or more cameras 208 may be positioned on or inside of inventory locations. For example, a series of cameras 208 may be positioned on external portions of the inventory locations and positioned to capture images of users, companions and/or the location surrounding the inventory location. Likewise, one or more cameras 208 may be positioned within the inventory locations to capture images of items stored in the inventory locations.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to camera's, other input devices, such as pressure sensors, infrared sensors, a scale, a light curtain, etc. may be utilized with the implementations described herein. For example, a pressure sensor and/or a scale may be used to detect when an item is added and/or removed from inventory locations.

In some instances, the user 204 may be accompanied by one or more companions 207. A companion, as used herein, may be a child, friend, pet (e.g., dog, cat, bird, pig), colleague, spouse, partner, etc. that is accompanying the user in a materials handling facility. When the user 204 and/or companion 207 arrive at the materials handling facility 200, one or more images of the user 204 and/or the user's companion 207 may be captured and processed. For example, the images of the user 204 may be processed to identify the user 204. This may be done using a variety of techniques such as facial recognition, pattern matching, etc. Likewise, the images of the companion 207 may be processed to either select or establish a companion profile, discussed below. Similar to identifying the user, facial recognition, pattern matching, etc. may be used to process the images of the companion. For example, images of the companion 207 may be processed to determine the companion type, size, shape, color, etc. and compared to stored companion profile information to determine if a companion profile already exists for that companion 207. If a companion profile does not exist, the inventory management system may establish a companion profile for the companion 207 and associate the companion profile with the companion 207 and the user 204.

The captured images and/or other inputs may also be used to establish a user pattern for the user 204 while located in the materials handling facility 200. The user pattern may identify an overall shape of the user 204 and/or companion 207, any distinguishing features of the user 204 and/or companion 207 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

Generally, the inventory management system 150 may include one or more input/output devices, such as imaging devices (e.g., cameras) 208, projectors 210, displays 212, speakers 213, microphones 214, etc. to facilitate communication between the inventory management system 150, the user 204 and/or the companion 207. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s), such as server system 203 that may be local to the environment (e.g., materials handling facility), remote from the environment, or any combination thereof.

The inventory management system 150 may utilize antennas 216 within the materials handling facility 200 to create a local wireless network 202 (e.g., Wi-Fi) so that the portable device 205 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202.

The following is an example use case for providing a user path for the user 204 through the materials handling facility 200 based on preferences of the user 204 and/or the companion 207. Upon entering the materials handling facility, the inventory management system 150 may identify the user 204 (e.g., facial recognition, user ID card, user provided information) and select an existing companion profile for the companion 207 that is associated with that user 204. Upon identifying the user 204, information (e.g., item retrieval history, view history, purchase history) may be retrieved from a user data store. Likewise, information about the companion 207 (e.g., determined areas of interest, aggression patterns toward other users/companions) may be retrieved from a companion profile data store. The user may provide to the inventory management system 150 and/or have an associated pick list identifying items to be retrieved from the materials handling facility retrieved from a data store. In other implementations, the inventory management system 150 may utilize information about the user to identify the items the user is likely to pick. For example, if the user historically picks the same four items each time they are in the materials handling facility, it may be determined that the user will again pick those same four items.

Based on the information about the user, the information about the companion and/or the pick list, a user path may be created and provided to the user. The user path provides a recommended path for the user to follow as they progress through the materials handling facility. The user path may be the shortest path needed through the materials handling facility to pick the identified items, the least congested path through the materials handling facility to pick the items, a path that includes one or more areas within the materials handling facility preferred by the user and/or the companion, a path that intersects with another user and/or another companion that is preferred by the user and/or the user's companion, a path that avoids another user and/or another companion, a path that passes by recommended products, a path that passes through a preferred area of the materials handling facility, etc. The user path may be provided to the user via the portable device 205, projected using one or more of the output devices, audibly output to the user, etc. As discussed further below, the path may be periodically updated as the user moves through the materials handling facility. For example, if the user does not follow the provided path, the path may be updated and a new path provided to the user. Likewise, if the path was developed to intersect with and/or avoid another user and/or another companion, if that other user and/or companion does not progress through the materials handling facility as anticipated, the user's path may be updated accordingly. As still another example, if the user picks an item that was not expected, information about that item may be used to identify other items of potential interest to the user. The user path may then be updated to route the user past those other items of potential interest.

In some implementations, as the user progresses through the materials handling facility 200, an imaging device 208 may obtain/capture one or more images of the user 204 and/or the companion 207 and provide the image(s) to the computing resource(s) 203 for processing. The computing resource(s) 203 may process the image(s) to identify any gestures presented by the companion (e.g., ears forward, ears back, ears lowered, a head down, head up, head tilted, a tail wagging, the tail tucked between legs of the companion, a showing of teeth, raised hair, an audible sound from the companion, or a pulling on a leash). For example, the images may be processed to detect changes in facial or head expressions of the companion. Those changes may be analyzed to detect gestures presented by the companion. If any gestures are presented, the inventory management system 150 may compare those gestures with gestures defined for that companion and/or general gestures for that companion type and update the companion profile with the current location, gesture of the companion, the resulting behavior of the companion and/or determine if an action needs to be performed.

As the user moves around the materials handling facility, the inventory management system 150 may assist the user in discovering information about items by processing images collected by input/output components 208-216 positioned around the materials handling facility. For example, imaging devices 208 may be used to obtain/capture images within the materials handling facility 200 that are processed by the computing resource(s) 203 to identify the location of the user 204 and/or gestures presented by the companion 204. Likewise, microphones 214 may record sounds made by the companion (e.g., barking) and the computing resource(s) may process those sounds to determine if any action should be performed. For example, if the companion is presenting an aggressive bark in the vicinity of another user and/or another user's companion, the barking may be captured by the microphone and processed by the computing resources. In response, the inventory management system 150 may determine to provide an audible and/or visual output near the companion in an effort to distract the companion. Likewise, the inventory management system 150 may notify the user of the aggressive behavior.

In addition to, or as an alternative to visual and/or audio location determination and tracking of the user, the inventory management system 150 may also utilize other techniques, such as triangulation between antennas 216, to determine the location of the user 204 as the user moves through the materials handling facility 200. In other examples, the portable device 205 may include a global positioning system (GPS) receiver that obtains GPS information as to the location of the portable device 205. In such an implementation, the portable device 205 may provide the received GPS information to the inventory management system 150.

When the user 204 is in a location of the materials handling facility (e.g., searching for an item, browsing), the inventory management system 150 may detect one or more gestures of the companion and use that information to determine the companions interest in the location and/or items within the location of the materials handling facility. For example, if the companion lies on the floor (a gesture) it may be determined that the companion has little interest in that location of the materials handling facility. In comparison, if the companion is actively looking at items in that location of the materials handling facility, it may be determined that the companion prefers that area of the materials handling facility. Based on the gesture(s) presented by the companion while in the location, the location may be identified as a preferred location for the companion. Likewise, if multiple companions of a same and/or similar type present the same gesture at the location, the location may be identified as a preferred location for companions of that type. For example, if all dog companions present gestures of interest and/or happiness while in the dog section of the materials handling facility, that location within the materials handling facility may be identified as a preferred location for all dog companions.

The companion's interest in the location and/or the items within the location may be added to the companion profile associated with the companion and utilized in determining a user path through the materials handling facility when the companion is with the user. While the above example discusses determining user path based on companion profiles, in other implementations other information or actions may be provided.

If information is presented to the user from the inventory management system 150 via the portable device 205, the user 204 may interact with the inventory management system 150 via the portable device 205. For example, the user 204 may interact with the portable device 205 by selecting (e.g., via a touch screen) one of the controls 224, 226, 228, 230. For example, if the user selects the "Item Info" control 224, the portable device 205 may submit a request to the inventory management system 150 for additional item information. The inventory management system 150, upon receiving an additional item information request from the portable device 205, may retrieve additional item information and provide it back to the user via the portable device 205. In other implementations, the additional item information may be provided via one or more displays located within the materials handling facility and/or by other means. For example, the inventory management system 150 may identify a display location near the user for presenting the information. If the user is in a location where there are displays, such as displays 212 that are available for use, the display 212 closest to the user 204 may be selected for presenting the additional item information to the user. Alternatively, a projector 210 may be used to project additional item information onto a surface area 229 near the user 204. Likewise, projectors 220, displays 212 and/or other output devices may be used to provide output for the companion. For example, if the inventory management system desires to have the companion look toward a camera, a light near the camera may flash, or a speaker near the camera may output a sound, to get the attention of the companion.

Figure 3:
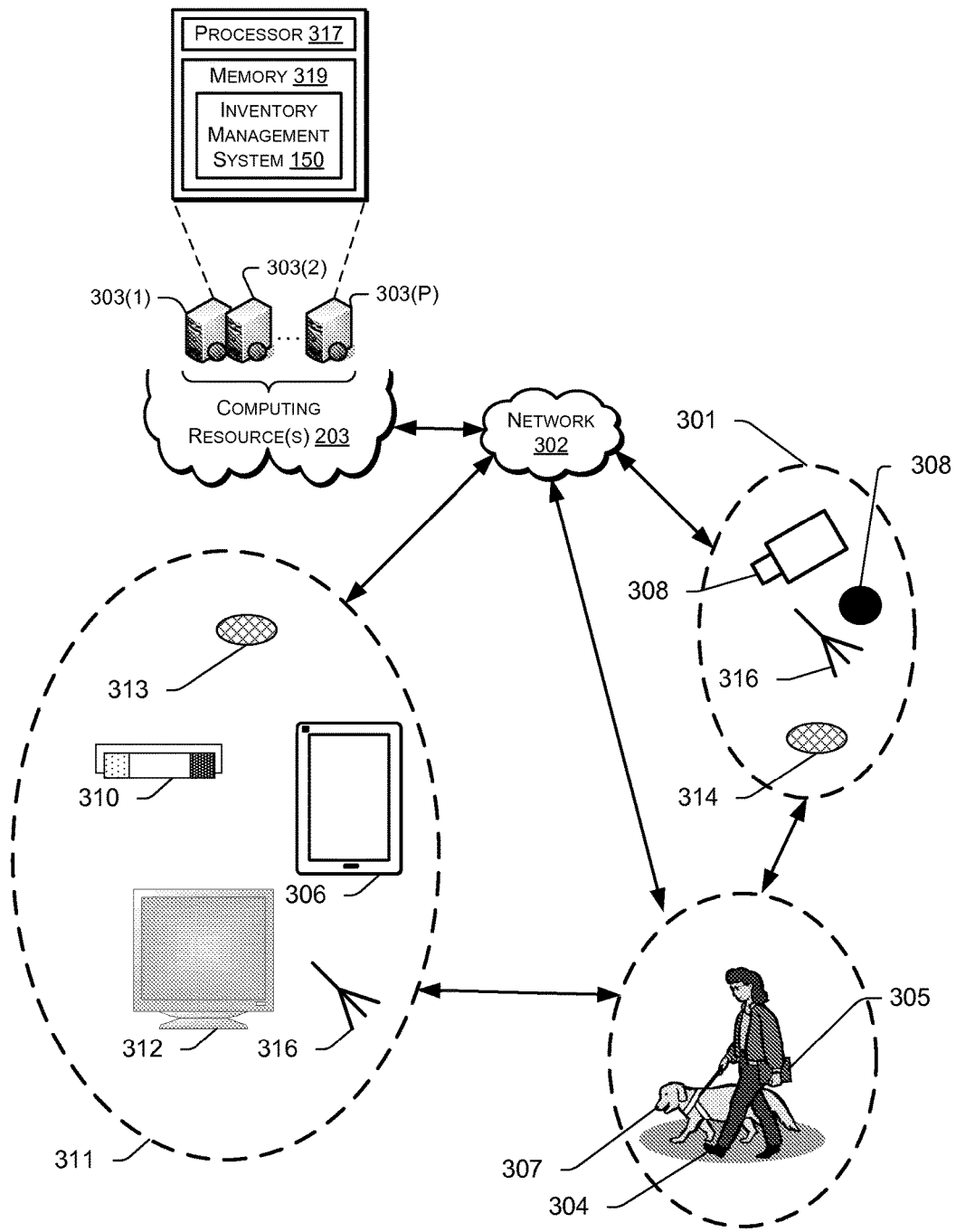
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 301, output components 311 and computing resource(s) 203. The input components 301 may include an imaging device 308, microphone 314, antenna 316, or any other component that is capable of receiving input about it surrounding environment, from the user of the portable device and/or from the portable device. The output components 311 may include a projector 310, a portable device 306, a display 312, an antenna 316, a radio (not shown), speakers 313 and/or any other component that is capable of providing assistance in the form of output to its surrounding environment, the user and/or the portable device.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 301, output components 311 and/or directly with the portable device 305 and/or the user 304.

As illustrated, the computing resource(s) 203 may be remote from the environment and implemented as one or more servers 303(1), 303(2), . . . , 303(P) and may, in some instances form a portion of a network-accessible computing platform implemented as a computing infrastructure of processors, storage, software, data access, and so forth that is maintained and accessible by components/device of the inventory management system 150 and/or the portable device 305 via a network 302 such as the Internet. For example, the computing resources 203 may process images of users 304 and/or user companion(s) 307 to identify the user 304, select a companion profile and/or to identify gestures presented by the companion 307. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4A:
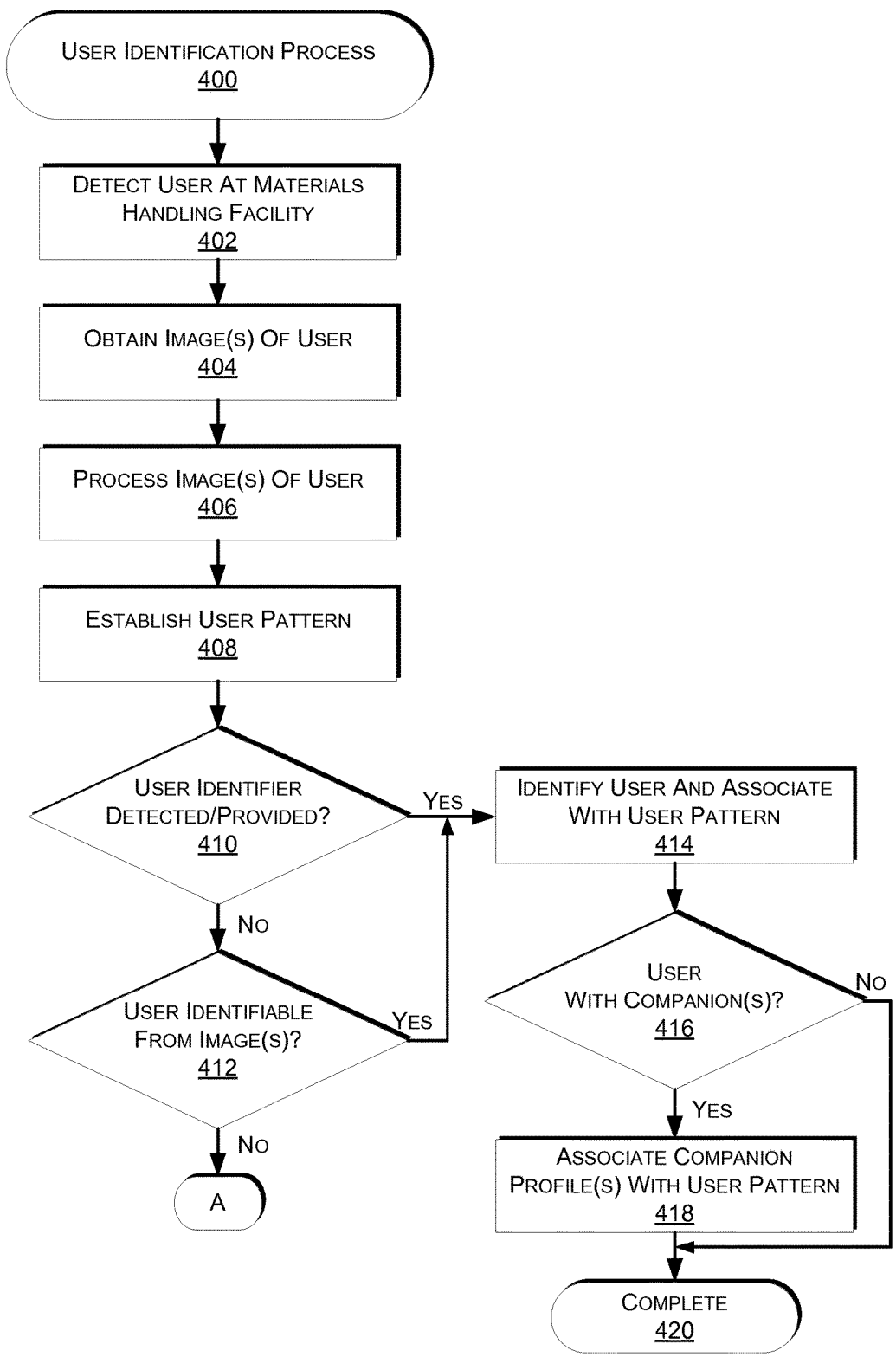
FIGS. 4A-4B depict a flow diagram of an example process for identifying a user, according to some implementations.
Figure 4B:
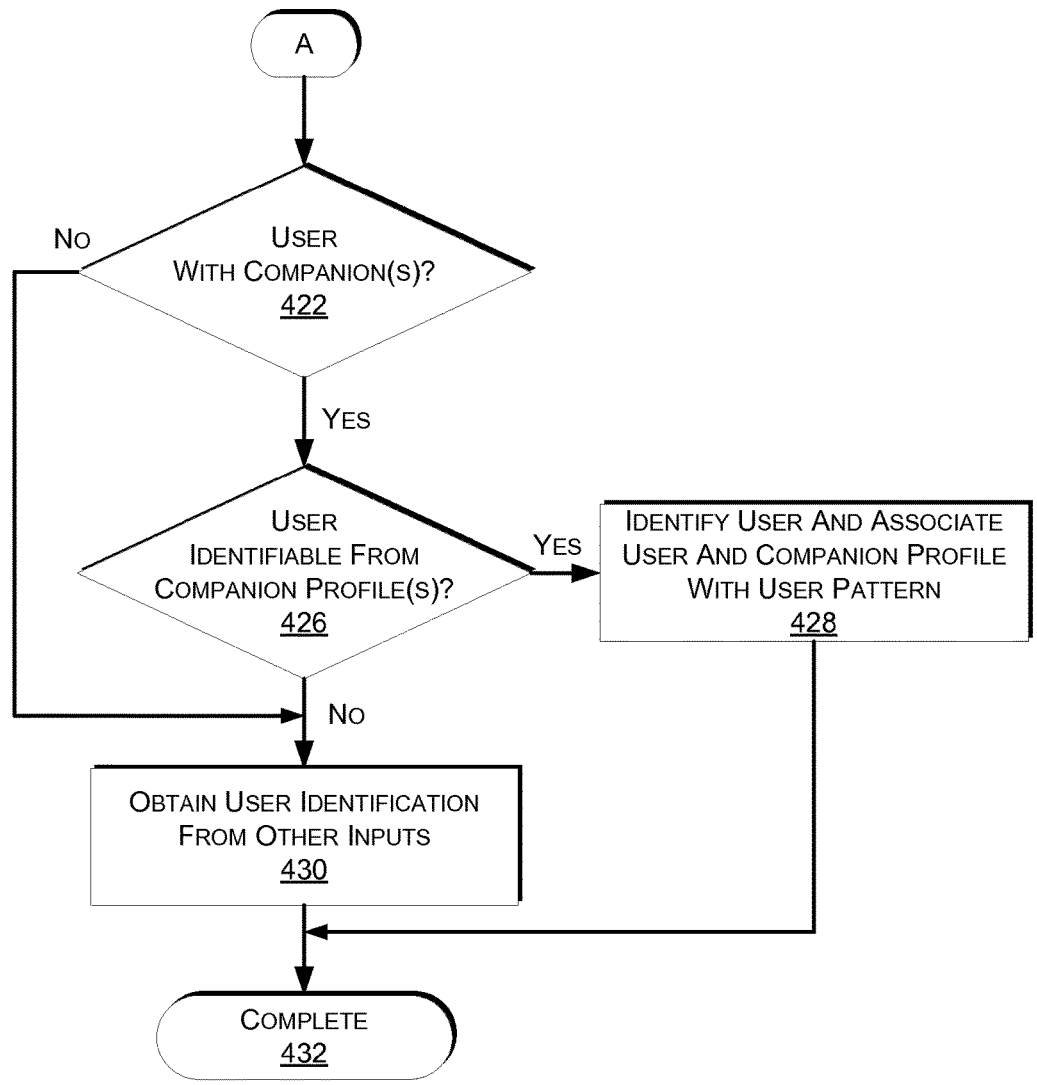

FIGS. 4A-4B depict a flow diagram of an example process 400 for providing assistance to a user, according to some implementations. The process of FIGS. 4A-4B and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by detecting a user at or within the materials handling facility, as in 402. Upon detecting a user at or within the materials handling facility, one or more images of the user are obtained, as in 404, and processed, as in 406. Various techniques may be used to process the images. For example, image capture and facial and/or feature recognition may be used to process the image. Based on the processed images, a user pattern representative of the image is established, as in 408. Generally, the user pattern is a representation of the user that can be used to assist in tracking and/or identifying the user within the materials handling facility. For example, the user pattern may be a two-dimensional representation of the user's size and shape. In other examples, the user pattern may be a three-dimensional representation of the user's size and shape.

In some implementations, distinguishing features of the user may be detected and included as part of the user pattern. For example, if the user is wearing a bright colored shirt, has a tattoo, is wearing a hat, etc. any of those distinguishing features may be detected and included as part of the user pattern. Likewise, the user's gate, cadence, body language, etc. may be included in the user pattern and utilized to assist in tracking and/or identifying the user within the materials handling facility.

Returning to the example process 400, upon establishing a user pattern for the detected user, a determination is made as to whether a user identifier was detected and/or provided by the user, as in 410. The user identifier may be any unique identification that is associated with the user. For example, the user identifier may be an active tag, such as a radio frequency identification ("RFID") tag, visual tag, such as a barcode, bokode, etc. or any other type of identifier that may uniquely identify the user.

If a user identifier is not detected and/or provided by the user, a determination is made as to whether the identity of the user can be determined from the obtained images, as in 412. For example, facial and/or feature recognition may be performed on the image(s) (as in 406) and the results compared to user profiles stored in the user profile data store. If the features obtained from the processed image correspond with a stored user profile, the user can be identified from the stored user profile. If the user is identifiable from the obtained images, or if a user identifier is detected and/or provided, the user is identified and associated with the user pattern, as in 414. Associating the user with the user pattern may include associating the user profile with the user pattern, a user account of the user with the user pattern, etc.

Upon identifying and associating the user with the user pattern, a determination is made as to whether the user is accompanied by one or more companions, as in 416. Similar to detecting the user and establishing a user pattern, a companion may be detected as a result of processing the obtained images. For example, if the image processing identifies another object next to the user that is the shape of a companion (e.g., child, friend, colleague, pet, spouse), it may be determined that the user is accompanied by a companion.

If it is determined that the user is with a companion, a companion profile is selected or established and associated with the user and/or the user pattern, as in 418. Selection and/or establishment of a companion profile for a detected companion is discussed in further detail below with respect to FIG. 5. Upon associating the companion profile with the user pattern, or if it is determined that the user is not with a companion, the example process 400 completes, as in 420.

Returning to decision block 412, if it is determined that the user is not identifiable from the obtained image(s), a determination is made as to whether the user is with a companion, as in 422 (FIG. 4B). If it is determined that the user is with a companion, a determination is made as to whether the user is identifiable from the companion profile identified for the companion. As noted above, selection and/or establishment of a companion profile is discussed below with respect to FIG. 5.

If the example process 500 (FIG. 5) was able to identify the companion profile for the companion independent of the user profile, the example process 400 (FIG. 4) may use the information included in the companion profile to assist in identifying the user. For example, the companion profile may be associated with user profiles for users that have previously brought the companion to the materials handling facility. Reducing the comparison of the processed images to only those users associated with the identified companion profile may result in a higher degree of confidence as to whether the user can be identified. Such identification may again be done through use of image matching (e.g., facial recognition) and/or the obtain images may be manually compared to the set of user profiles associated with the identified companion profile. For example, if the companion profile is associated with two user profiles, the images stored with those user profiles may be compared by an operator to the images obtained of the user (block 404) and a determination made as to whether the current user matches one of the user profiles associated with the companion profile.

If the user is identifiable from the selected companion profile, the user is identified and both the user profile and the companion profile are associated with the user pattern, as in 428. Associating a user profile and a companion profile with a user pattern is discussed above with respect to blocks 414 and 418, respectively. However, if it is determined that the user cannot be identified from the companion profile or if it is determined that the user is not with a companion, identification of the user is obtain through other inputs, as in 430. For example, the user may be asked for identification, the user may continue to be monitored until a user identification can be determined, etc. Upon obtaining the user identification from other inputs, or after associating the user profile and the companion profile with the user pattern, the example process 400 completes, as in 430.

Figure 5:
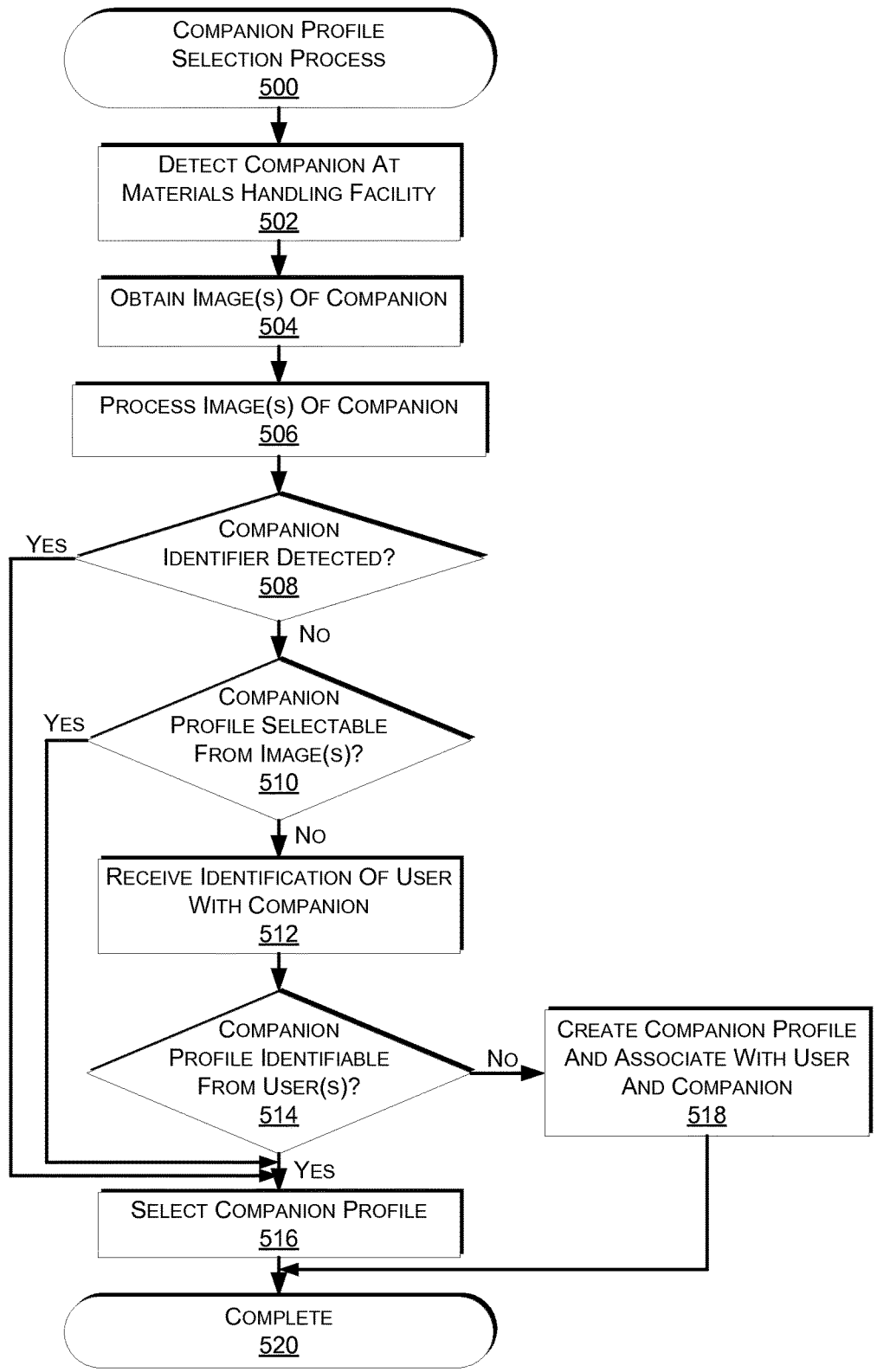
FIG. 5 depicts a flow diagram of an example process for selecting a companion profile, according to some implementations.

FIG. 5 is a block diagram of an example process 500 for selecting a companion profile, according to some implementations. The example process 500 begins by detecting a companion at or within a materials handling facility, as in 502. Upon detecting a companion at or within the materials handling facility, one or more images of the companion are obtained, as in 504, and processed, as in 506. Various techniques may be used to process the images. For example, image capture and facial and/or feature recognition may be used to process the image.

A determination may then be made as to whether a companion identifier was detected, as in 508. The companion identifier may be any unique identification that is associated with the companion. For example, the companion identifier may be an active tag, such as a radio frequency identification ("RFID") tag, visual tag, such as a barcode, bokode, etc. or any other type of identifier that may uniquely identify the companion.

If a companion identifier is not detected, a determination is made as to whether a companion profile can be selected from the obtained image(s), as in 510. For example, facial and/or feature recognition may be performed on the image(s) (as in 506) and the results compared to companion profiles stored in the companion profile data store. If the features obtained from the processed image(s) correspond with a stored companion profile, the companion profile can be selected. If the companion profile can be selected from the obtained images or if a companion identifier is detected, the corresponding companion profile can be selected, as in 518.

If the companion profile cannot be selected from the image(s), an identification of the user with the companion may be received in the form of a user profile, as in 512. Identification of a user with the companion is discussed above with respect to FIG. 4. If a user profile for the user with the companion is received, a determination is made as to whether the companion profile for the companion is identifiable from the user profile, as in 514. For example, the user profile may have one or more associated companion profiles. By comparing the processed images of the companion with the one or more associated companion profiles rather than all potential companion profiles, the companion may be identifiable. Comparison of the processed images of the companion with stored companion profiles associated with the identified user may be done autonomously or with input from an operator. For example, the results of facial and/or feature recognition may be compared to stored companion profiles to determine if the companion profile is selectable from the companion profiles associated with the user profile. Alternatively, an operator may compare the obtained images of the companion with images included in the companion profiles associated with the identified user to determine if the companion profile is selectable.

If it is determined that the companion profile cannot be determined from the companion profiles associated with the received user profile, a companion profile is created for the companion and associated with the user, as in 516. A companion profile may include, for example, the type of the companion, the size of the companion, the shape of the companion, the color of the companion, generally defined gestures for the companion, etc. If the companion profile is selectable from the companion profiles associated with the user profile, if a companion identifier was detected, or if the companion profile is selectable from the obtained images, the companion profile is selected, as in 518. Upon selection of a companion profile or creation of a companion profile, the example process 500 completes, as in 520.

Figure 6:
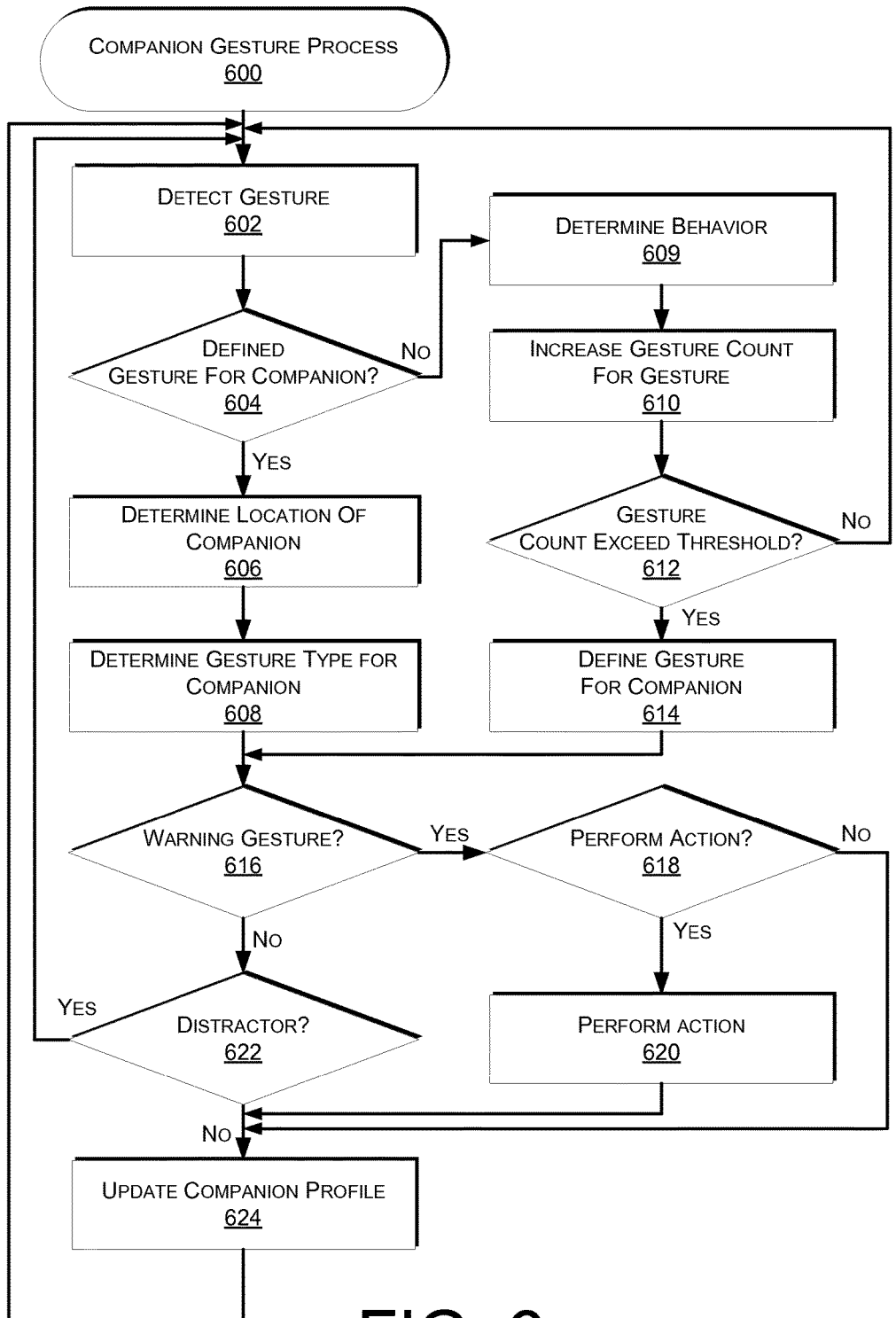
FIG. 6 depicts a flow diagram of an example process for processing gestures of a companion, according to some implementations.

FIG. 6 is a block diagram of an example process 600 for processing companion gestures, according to some implementations. The example process 600 begins upon detecting a gesture of a companion, as in 602. A gesture may be detected using a variety of techniques. For example, images of the companion may be obtained and processed while the companion is within the materials handling facility. The processed images may be analyzed to determine if a potential gesture has been presented by the companion. Companion gestures may be different for different types of companions and/or different gestures may be defined for different companions. For example, dog companions may have generally defined gestures, such as wagging of their tail, ears forward, ears back, raised hair, teeth showing, tails between their legs, head titled sideways, head down, head up, etc. In comparison, human companions (e.g., child, spouse, friend, colleague) may have gestures such as macro and/or micro-expressions (e.g., smiling, winking, frowning, curling of lips), waving of hands, talking, etc. Expressions may be used to represent emotions such as happiness, sadness, anger, aggression, disinterest and/or fear.

Upon detecting a gesture, a determination is made as to whether the gesture is a defined gesture for the companion, as in 604. A defined gesture may be any generally defined gesture for the type of companion and/or a specific gesture that has been defined for the companion based on past experiences with the companion. Generally defined gestures for a companion type may be any gesture that is common across companions of that type. For example, all dogs wag their tail to express happiness. A defined gesture for the companion may be any gesture that has been previously presented a determined number of times followed by a behavior of the companion, such that a meaning for the gesture can be determined. For example, if the companion consistently pulls on their leash when they identify an item of interest, such a gesture may be defined for the companion.

If it is determined that the gesture is a defined gesture for the companion, a location of the companion within the materials handling facility is determined, as in 606, and a gesture type for the companion is determined as in 608. A gesture type may be any defined relationship between the gesture and behavior of the companion. For example, a gesture type may be interest, anger, warning, confusion, etc.

Returning to decision block 604, if it is determined that the detected gesture is not a defined gesture for the companion, the resulting behavior that corresponds with the new gestures is determined, as in 609. The resulting behavior may be anything the companion does while or after presenting the gesture. A gesture count for the detected gesture is also increased, as in 610. The gesture count is a count of the number of times the gesture and the resulting behavior has been presented by the companion. In some implementations, the gesture count may be maintained only during the time that the companion is in the materials handling facility. In other implementations, the gesture count may be maintained over a period of time, regardless of how many times the companion is in the materials handling facility. For example, the gesture count may be maintained for the life of the companion and each time the gesture is presented, the location and resulting behavior determined. Upon increasing the gesture count, a determination is made as to whether the gesture count exceeds a threshold, as in 612. The threshold may be any defined number that must be matched or exceeded before the new gesture is established as a specific defined gesture for the companion.

If it is determined that the gesture count exceeds the threshold, the gesture is defined for the companion, as in 614. A specific defined gesture may include the gesture, the resulting behavior, the location of the companion within the materials handling facility and/or other information about the gesture.

Upon defining a gesture for the companion or after the gesture type for the companion has been determined, a determination is made as to whether the gesture is a warning gesture, as in 616. A warning gesture may be any gesture that presents potential danger to the user, other users, the companion and/or other companions. For example, a warning gesture may be the companion showing teeth, barking and/or having raised hair, or otherwise presenting aggression gestures. If the gesture is a warning gesture, a determination is made as to whether an action is to be performed, as in 618. An action may be any action performed in response to the warning gesture. Continuing with the above example, if the warning gesture is a gesture of aggression toward another user, the action may be to present an audible and/or visual distracter to try and distract the companion. Alternatively, the user may be alerted and provided guidance to control and/or remove the companion from the area. In still another example, the action may be to notify the other user of the potential danger. If is determined that an action is to be performed, instructions are issued to cause the action, as in 620.

Returning to decision block 616, if it is determined that the gesture is not a warning gesture, a determination is made as to whether a distracter is present, as in 622. A distracter may be any object that is foreign to the materials handling facility that may have caused the gesture. For example, a distracter may be a child that is near the companion, another companion, etc. If it is determined that there is a distracter that may have caused the gesture, the gesture is discarded and the example process 600 returns to block 602 and continues. In other implementations, the distracter may be identified and included along with the gesture in the companion profile.

If it is determined that there is no distracter, the companion profile is updated to include the gesture, the location of the companion within the materials handling facility and/or the behavior of the companion resulting from the companion, as in 624. For example if the companion is of the dog type, located in the pet isle of a materials handling facility and presents a gesture of tail wagging when it passes by a bag of balls, such information may be included in the companion profile. In a similar manner, if the same companion looks away from items related to cats, the gesture of dis-interest may be detected and the gesture, behavior and location of the companion may be stored in the companion profile. As discussed below, such information may be used to assist in developing a user path for a user when accompanied by the companion.

Figure 7:
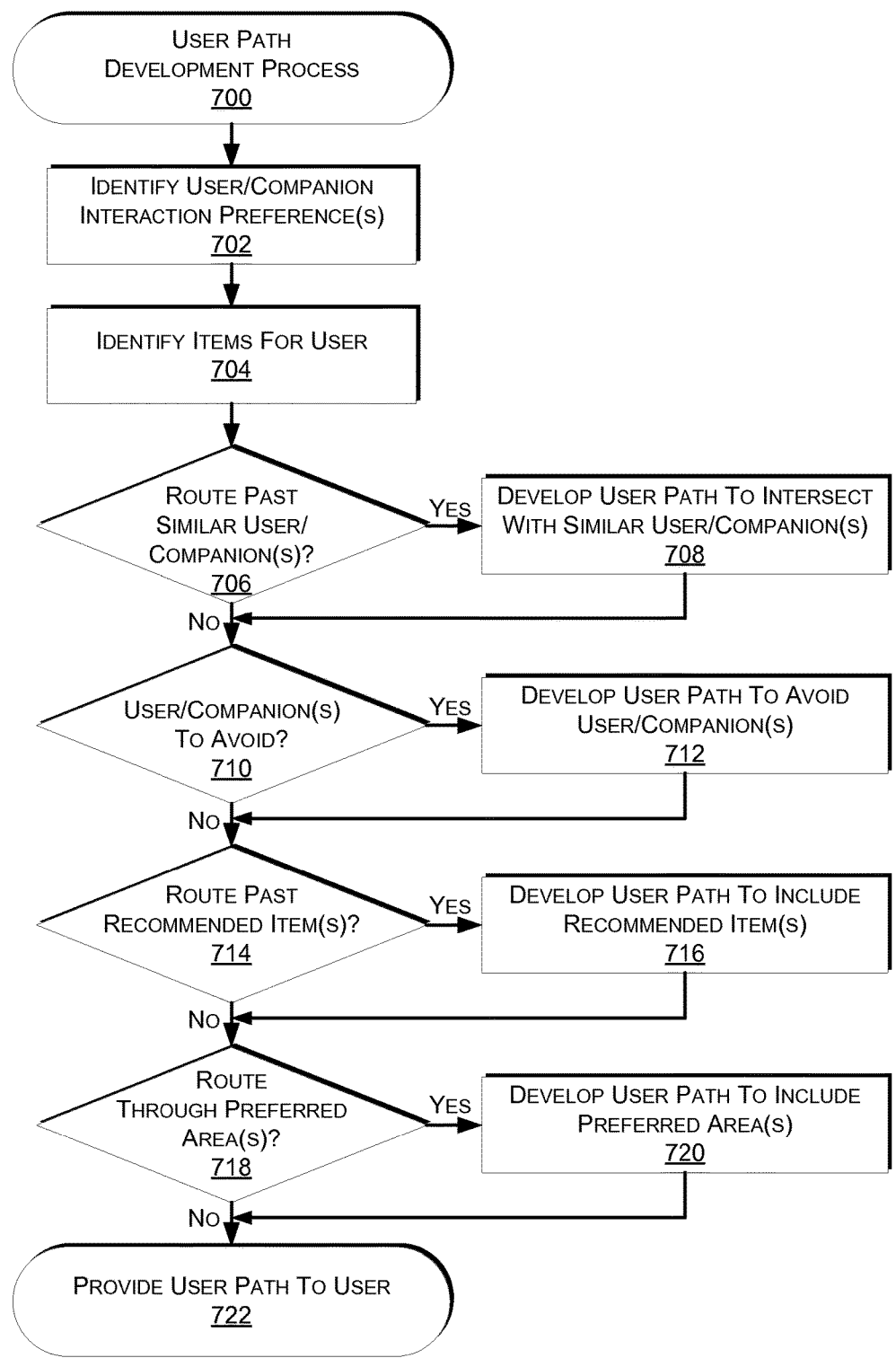
FIG. 7 depicts a flow diagram of an example process for developing a user path, according to some implementations.

FIG. 7 is a block diagram of an example process 700 for developing a user path, according to some implementations. The example process 700 begins by identifying user and/or companion interaction preferences, as in 702. A user may specify their interaction preference and/or preferences may be determined based on the actions of users while in the materials handling facility. For example, a user may indicate that they prefer to get into the materials handling facility, pick their items and leave the materials handling facility as fast as possible without having to interact with anyone. In another example, a user may indicate that they are interested in interaction with other known users, other similar users and/or other users that have similar companions. Likewise, based on the gestures and resulting behaviors associated with companion profiles, companion preferences may be determined. For example, if a companion is a type of dog and presents aggression gestures whenever the companion comes close to other users and/or companions, it may be determined that the companion prefers not to interact with other users and/or other companions. Alternatively, the companion may present gestures of happiness when confronted with other users and/or other companions. In such an example, it may be determined that the companion prefers to interact with other users and/or other companions.

In addition to determining user and/or companion preferences, items to be picked by the user may be identified, as in 704. In some implementations, the user may provide or be provided a list of items to be picked from the materials handling facility. In other implementations, the items the user will likely pick from the materials handling facility may be determined based on the user's profile. For example, the user profile may identify the items the user has previously picked, the frequency with which those items were picked and the likelihood of a re-picking of those items (e.g., the item has likely been consumed). For example, if the materials handling facility is a store and the user picks the same three items each time they are in the store, it may be determined that the user is likely to pick those three items.

Based on the user and/or companion interaction preferences, a determination may be made as to whether to route the user past similar and/or known users and/or companions, as in 706. For example, if the user has historically stopped and interacted with a particular other user, the example process may determine if that other user is in the materials handling facility and if so, route the user such that the two user paths intersect. Likewise, if the companion presents happy gestures (tail wagging, ears forward) when confronted with another user and/or another companion, the user may be routed such that their path interests with the path of the other user/companion. In other implementations, the historical information about the user and/or companion may be used to identify other users and/or other companions within the materials handling facility that are similar. For example, if the companion always presents gestures of happiness when confronted with another companion of the same type, such information may be used to identify other users with companions of the same type. If it is determined that the user is to be routed past similar users and or users with similar companions, a user path is developed that intersects with the path of the other user and/or other user with a similar companion, as in 708.

In addition to determining whether to route a user past similar other users and/or companions, a determination may also be made as to whether there are other users and/or other companions within the materials handling facility that should be avoided, as in 710. For example, if the companion has presented gestures of aggression toward other companions and/or other users that are within the materials handling facility, it may be determined that those other users and/or other companions should be avoided. In a similar manner, if it is determined that other users and/or other companions are in the materials handling facility that have presented gestures of aggression toward the user and/or the companion, those users and/or companions may also be avoided. In still other examples, it may be generally applied that some companions of one type are typically incompatible and/or have conflict with companions of another type. For example, dog companions may typically conflict with cat companions. Paths of users with incompatible types of companions may be avoided. If it is determined that other users and/or other companions within the materials handling facility are to be avoided, the user path is developed such that those users and/or companions are avoided, as in 712.

A determination may also be made as to whether the user and/or companion should be routed past recommended and/or preferred items, as in 714. For example based on past purchase history and/or past gestures of the companion, one or more items may be recommended. For example, if the companion's prior gestures toward a particular item and/or item type within the materials handling facility have been one of interest, the item may be identified as a recommended item. Likewise, based on past purchase history of the user, one or more similar items may be identified as recommended items. In some implementations, items may be recommended based on information about the companion. For example, if the companion is a large dog, a brand and/or size of dog food may be recommended to the user that is appropriate for a large dog. Likewise, if the dog is a young, growing dog, dog food designed for young, growing dogs may be recommended. Alternatively, if the companion is a cat, food and/or toys recommended for the cat may be recommended. If it is determined that the user is to be routed past recommended items, the user path is developed such that the user passes by recommended items as they progress through the materials handling facility, as in 716.

Finally, a determination may be made as to whether the user should be routed through areas within the materials handling facility preferred by the companion, as in 718. For example, based on the historical gestures of the companion, certain areas of the materials handling facility may consistently result in the companion presenting gestures of interest and/or happiness. Such areas may be established as preferred areas for the companion. If it is determined that the user is to be routed through preferred areas, the user path is developed to include those areas within the materials handling facility, as in 720.

Upon determining the routing preferences for the user path, the user path may be completed and provided to the user, as in 722. For example, the user path may be provided to the portable device of the user, projected from an output device within the materials handling facility, displayed on an output device within the materials handling facility, provided audibly to the user, etc.

The example process 700 and the resulting user path may be periodically updated as the user progresses through the materials handling facility. For example, if the user does not follow the provided path, the example process 700 may be performed again based on the current location of the user and a new path may be determined and provided to the user. Likewise, if the path was developed to intersect with and/or avoid another user and/or another companion, if that other user and/or companion does not progress through the materials handling facility as anticipated, the example process 700 may consider the change in the location of the user and other users in the materials handling facility and update the user's path. As still another example, if the user picks an item that was not expected, information about that item may be used to identify other items of potential interest to the user. The user path may then be updated to route the user past those other items of potential interest.

While the examples provided in the example process 700 are illustrated in a serial process, in other implementations, the decision may be made in any order and/or in parallel. Likewise, other factors may be considered in the development of a user path through the materials handling facility. For example, the user path and/or preference may vary depending on the time of day, gestures presented by the user, the day of the week, the time of year, etc.

Figure 8:
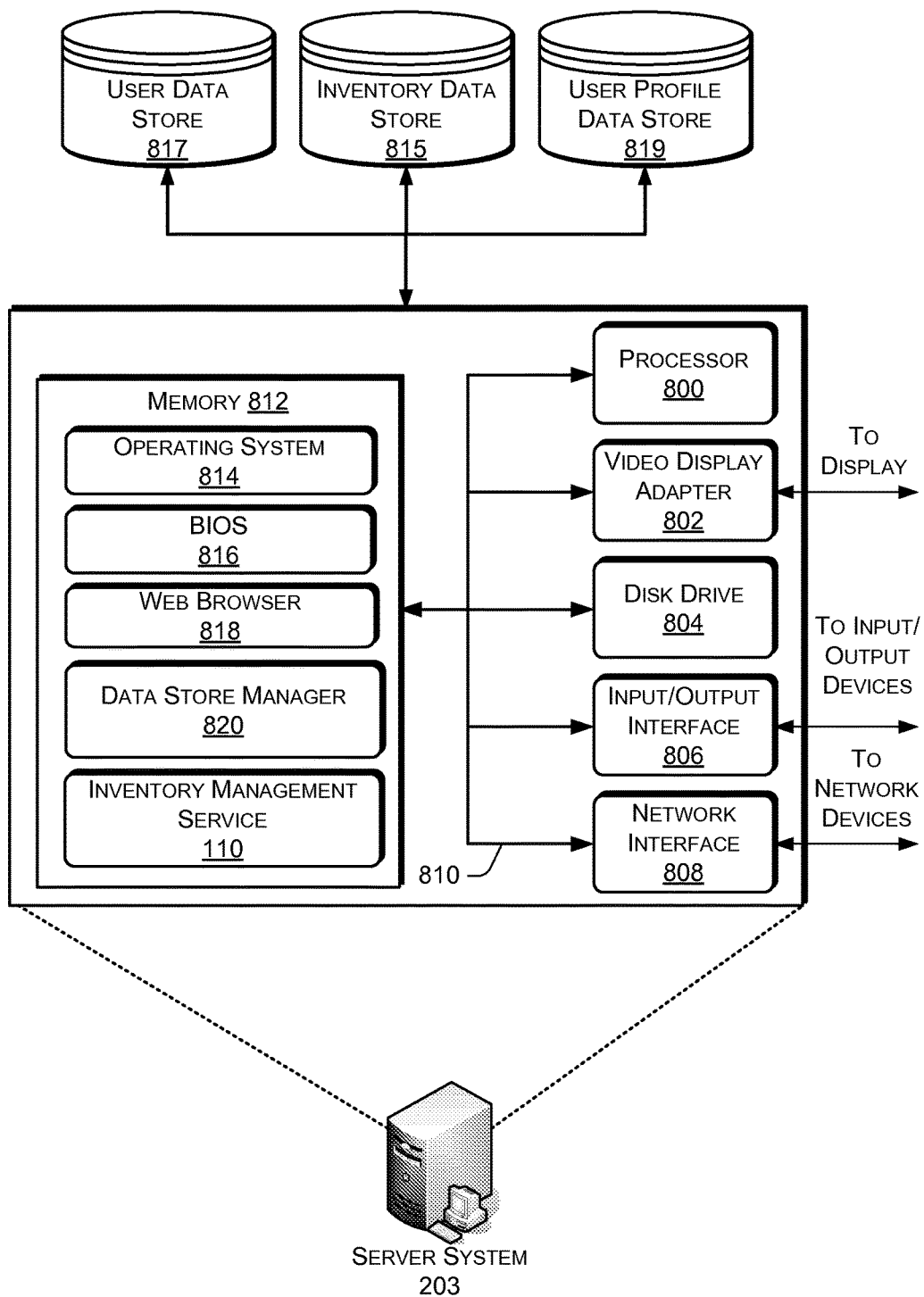
FIG. 8 is a block diagram of an illustrative implementation of a server system that may be used with various implementations.

FIG. 8 is a pictorial diagram of an illustrative implementation of a server system, such as the server system 203 that may be used in the implementations described herein. The server system 203 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 203 to monitor and configure operation of the server system 203. The input/output interface 806 likewise communicates with external input/output devices not shown in FIG. 8, such as a mouse, keyboard, scanner, or other input and output devices that can be operated by an operator of the server system 203. The network interface 808 includes hardware, software, or any combination thereof, to communicate with other computing devices. For example, the network interface 808 may be configured to provide communications between the server system 203 and other computing devices via the network 202, as shown in FIG. 2 and FIG. 3.

The memory 812 generally comprises random access memory (RAM), read-only memory (ROM), flash memory, and/or other volatile or permanent memory. The memory 812 is shown storing an operating system 814 for controlling the operation of the server system 203. A binary input/output system (BIOS) 816 for controlling the low-level operation of the server system 203 is also stored in the memory 812.

The memory 812 additionally stores program code and data for providing network services that allow the inventory management system 150 to identify users, companions and/or gestures presented by users and/or companions. Accordingly, the memory 812 may store a browser application 818. The browser application 818 comprises computer executable instructions, that, when executed by the processor 800 generate or otherwise obtain configurable markup documents such as Web pages. The browser application 818 communicates with a data store manager application 820 to facilitate data exchange between the inventory data store 815, the user data store 817 and/or the companion profile data store 819.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 815, 817, 819 as needed to execute aspects of the inventory management system 150.

The data stores 815, 817, 819 can include several separate data tables, databases or other data storage mechanisms and media for storing data relating to a particular aspect. For example, the data stores 815, 817,819 illustrated include mechanisms for inventory information, user information, companion profile information, etc. which can be used to identify users, detect gestures of companions and/or develop user paths for users.

It should be understood that there can be many other aspects that may be stored in the data stores 815, 817, 819. The data stores 815, 817, 819 are operable, through logic associated therewith, to receive instructions from the server system 203 and obtain, update or otherwise process data in response thereto.

In addition to maintaining information about inventory and determining whether to provide assistance, the inventory management system 150 may provide assistance to the users. For example, the inventory management system 150, through communication between the server system 203, may provide information about an item to a user.

The memory 812 may also include the inventory management system 150, discussed above. The inventory management system 150 may be executable by the processor 800 to implement one or more of the functions of the server system 203. In one implementation, the inventory management system 150 may represent instructions embodied in one or more software programs stored in the memory 812. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
a plurality of cameras positioned within a materials handling facility, each camera of the plurality of cameras configured to generate image data of objects located within the materials handling facility;
one or more processors; and
a memory coupled to the one or more processors and storing program instructions that when executed by the one or more processors cause the one or more processors to at least:
receive, from at least one of the plurality of cameras, an image of a pet located at the materials handling facility, wherein the pet is a non-human animal accompanying a user at the materials handling facility;
process the image to determine at least one of a type of the pet, a shape of the pet, a size of the pet, or a color of the pet;
select a companion profile based at least in part on the determined at least one of the type of the pet, the shape of the pet, the size of the pet, or the color of the pet;
establish a user pattern that includes information about the user and the selected companion profile,
monitor a location of the user within the materials handling facility; and
recommend, based at least in part on the companion profile or the location, an item to the user that is of interest to the pet.

2. The system of claim 1, wherein an identity of the user is determined based at least in part on the selected companion profile.

3. The system of claim 1, the program instructions when executed by the processor further causing the processor to at least:
detect an identifier associated with the pet, wherein the identifier is at least one of a visual identifier associated with the pet or an active identifier associated with the pet; and
wherein the companion profile is selected based at least in part on the detected identifier.

4. The system of claim 1, the program instructions when executed by the processor further causing the processor to at least:
   determine a user path based at least in part on the user and the selected companion profile, wherein the user path provides a recommended path for the user through the materials handling facility.

5. The system of claim 4, wherein the user path is determined based at least in part on one or more of: a preference provided by the user indicating whether the user desires to have the user path intersect with another user path of another user in the materials handling facility, a determination that the user path should avoid the user path of another user in the materials handling facility, a determination to route the user path past an item recommended for the user, a determination to route the user path past an item recommended for the pet, or a determination to route the user path through an area of the materials handling facility that is preferred by the pet.

6. A computer-implemented method for providing assistance to users within a materials handling facility, comprising:
   under control of one or more computing systems configured with executable instructions,
      identifying, based at least in part on data received from one or more input components located in the materials handling facility, a user located within the materials handling facility;
      receiving from at least one camera located within the materials handling facility, an image of the user;
      processing the image to determine that a non-human companion is with the user;
      selecting a companion profile representative of the non-human companion; and
      developing a user path through the materials handling facility for the user based at least in part on the companion profile.

7. The computer-implemented method of claim 6, wherein the non-human companion is a dog, a cat, a pig or a bird.

8. The computer-implemented method of claim 6, wherein the companion profile includes preference information for the non-human companion, wherein the preference information is based at least in part on a gesture presented by the non-human companion while in the materials handling facility.

9. The computer-implemented method of claim 8, wherein the gesture is at least one of an expression of happiness, sadness, anger, aggression, disinterest, or fear.

10. The computer-implemented method of claim 8, wherein the non-human companion is a dog and the gesture is at least one of ears forward, ears back, ears lowered, a head down, the head up, the head tilted, a tail wagging, the tail tucked between a plurality of legs of the non-human companion, a showing of teeth, a raised hair, an audible sound from the non-human companion, or a pulling on a leash, yawning, crying, laying on the ground, pointing, waiving, screaming, whining, frowning, smiling, pouting.

11. The computer-implemented method of claim 6, wherein the user path identifies a route through the materials handling facility that includes a location within the materials handling facility likely to be preferred by the non-human companion.

12. The computer-implemented method of claim 11, wherein the location is selected based at least in part on one or more of a gesture presented by the non-human companion while at the location, gestures presented by other non-human companions of a same type while at the location, or an item at the location.

13. The computer-implemented method of claim 6, further comprising:
   determining a first route of a second user through the materials handling facility; and
   wherein developing the user path includes:
      determining, based at least in part on the first route, a second route through the materials handling facility that intersects with the first route of the second user such that the user and the non-human companion pass the second user as the user follows the second route and the second user follows the first route.

14. The computer-implemented method of claim 13, further comprising:
   selecting the second user based at least in part on at least one of:
      a first similarity between the user and the second user; or
      a second similarity between the non-human companion and a second companion associated with the second user.

15. The computer-implemented method of claim 14, further comprising:
   determining the second similarity between the non-human companion and the second companion based at least in part on a prior interaction between the non-human companion and the second companion.

16. The computer-implemented method of claim 6, wherein the user path identifies a route through the materials handling facility that avoids a route of a second user.

17. A method, comprising:
   detecting, based at least in part on first data received from a first sensor, a presence of a user;
   detecting, based at least in part on second data received from the first sensor or a second sensor, a presence of a non-human companion with the user;
   determining a plurality of companion profiles associated with the user;
   comparing at least a portion of the second data with the plurality of companion profiles to determine a companion profile of the plurality of companion profiles associated with the user; and
   developing a user path for the user based at least in part on the companion profile.

18. The method of claim 17, further comprising:
   determining, based at least in part on the companion profile, an item to recommend to the user that is of interest to the non-human companion.

19. The method of claim 17, further comprising:
   determining a planned route of a second user; and
   developing, based at least in part on the planned route of the second user, the user path such that the user and the non-human companion will intersect with the second user.

20. The method of claim 17, further comprising:
   determining a planned route of a second user; and
   developing, based at least in part on the planned route of the second user, the user path such that the user path and the planned route do not intersect.

21. A method, comprising:
   selecting a profile representative of a non-human that is associated with a user; and
   developing a path based at least in part on the profile.

22. A system, comprising:
one or more processors; and
a memory coupled to the one or more processors and storing program instructions that when executed by the one or more processors cause the one or more processors to at least:
 develop a path through the materials handling facility for a non-human animal;
 determine a presence of the non-human animal; and
 present at least a portion of the path.

23. The system of claim 22, further comprising:
a camera; and
wherein the program instructions, that when executed by the one or more processors further cause the one or more processors to at least:
 receive from the camera, an image of a user; and
 process the image to determine that the non-human animal is with the user.

24. The system of claim 22, wherein the program instructions, that when executed by the one or more processors further cause the one or more processors to at least:
 determine a preference of the non-human animal; and
 wherein developing the path is further based at least in part on the preference of the non-human animal.

* * * * *